US005139224A

United States Patent [19]

Bright

[11] Patent Number: 5,139,224

[45] Date of Patent: Aug. 18, 1992

[54] SOLENOID ARMATURE BOUNCE ELIMINATOR

[75] Inventor: John S. Bright, Newport News, Va.

[73] Assignee: Siemens Automotive L.P., Auburn Hills, Mich.

[21] Appl. No.: 766,473

[22] Filed: Sep. 26, 1991

[51] Int. Cl.[5] .............. F16K 31/06

[52] U.S. Cl. .............. 251/50; 251/54; 251/129.15; 251/129.16

[58] Field of Search .............. 251/129.15, 129.16, 251/50, 54

[56] References Cited

U.S. PATENT DOCUMENTS

| | | | |
|---|---|---|---|
| 4,794,890 | 1/1989 | Richeson, Jr. | 251/54 X |
| 4,878,650 | 11/1989 | Daly et al. | 251/50 X |
| 5,005,803 | 4/1991 | Fritz et al. | 251/129.15 |

*Primary Examiner*—Arnold Rosenthal

*Attorney, Agent, or Firm*—Russel C. Wells; George L. Boller

[57] ABSTRACT

An absorber is position on the back or opposite side of a solenoid to receive the kinetic energy of the armature. The energization of the solenoid attracts the armature to the solenoid core and upon striking the core, the kinetic energy of the armature is transferred through the core and to the absorber. The absorber is launched into flight for the purposes of dissipating the kinetic energy and returns to rest on the core without effecting the movement of the armature. The absorber dissipates the kinetic energy by transferring it to a spring means and also may dissipate the energy by means of viscous damping or the flow of fluid from one side of the absorber to the opposite side.

10 Claims, 1 Drawing Sheet

SOLENOID ARMATURE BOUNCE ELIMINATOR

FIELD OF THE INVENTION

This invention relates in general to solenoid having an armature for actuating valves in general and more particularly to a means for armature bounce-prevention.

BACKGROUND OF THE INVENTION

Armature bounce in solenoid actuated valves has and is a concern as the time of operation of the valve becomes faster and faster. In many instances, the solution has been to proving some form of dampening means when the armature is released from the actuated solenoid and the armature "slams" into a stop such as a valve seat.

U.S. Pat. No. 5,033,716, entitled "Electromagnetic Fuel Injector" by Mesenich teaches the use of hydraulic damping gaps on the armature and stator to reduce the bounce of the armature when it strikes the stator by allowing the fluid to be squeezed out from between the surfaces instead of forming a solid fluid link.

U.S. Pat. No. 4,978,072, entitled "Solenoid Actuated Valve Assembly" by Weinand, teaches the use of a resilient pad on the face of the stator to absorb the impact of the armature against the stator upon energization to reduce armature bounce. Upon de-energization, the armature and valve stem separate when the valve is closed and the valve-closing kinetic energy of the armature is dissipated without affecting closing.

U.S. Pat. No. 4,957,275, entitled "Control Valve" by Homes makes use of the principle of fluid dampening on the de-energization of the solenoid and the return of the armature to its normal position.

U.S. Pat. No. 4,878,650 entitled "Armature with Shear Stress Damper" by Daly makes use of viscous shearing of a mass on the armature to dampening the movement of the armature on the de-energization of the solenoid and the return of the armature to its normal position.

SUMMARY OF THE INVENTION

With few exceptions, the concern has been on the closing of the solenoid actuated valve to reduce or eliminate the rebound of the valve stem at that time. In the above identified U.S. Pat. No. 5,033,716, as the armature approaches the stator upon energization, the fluid surrounding the armature and stator face is squeezed out from between the two approaching surfaces. By having gaps in the surfaces, the fluid can be dissipated in a controlled manner causing the armature to slow down and not rebound.

In the design of pulse width modulated electromagnetic solenoid valves for fuel injection, flow linearity over various duty cycles is critical. Flow is influenced by opening time, open time, closing time and closing bounce. Closing time varies due to differences in instantaneous velocity and position of the armature while it is bouncing against the stator immediately after opening. This bouncing creates unacceptable flow variations.

With the armature in a solenoid operated valve rebounding, the either on the opening or the closing of the valve, the control times of the valve are not repeatable.

It is an objective of this invention to stop armature bounce on energization so that the operating time will be consistent with a resultant linearity improvement in fluid flow.

The present invention is directed to controlling the armature bounce when the solenoid is energized and the armature is magnetically attracted to the stator. If the armature is bouncing, the valve may or will momentarily close, if the bounce is large enough, or if not that large, the opening volume of the valve is reduced as the armature closes the opening, even so slightly. In the alternative or maybe in the same valve, if the armature is bouncing because it is rebounding from the stator, and the control means de-energizes the solenoid to return the armature to its normal position which typically closes the valve, the armature being already moving away from the stator will close faster or if the rebound is in the direction back toward the stator, the valve will close later.

The invention herein is a means of eliminating armature bounce in a solenoid actuated valve when the solenoid is energized and the armature strikes the solenoid. Positioned in a central bore of the valve is a solenoid having an cylindrical "E" core with the inner pole extending further than the outer pole. An armature is placed in axial relationship to the solenoid and faces the extended inner pole. Attached to the web of the solenoid is an ridge means on the outer surface of the solenoid opposite the armature. An absorber member is placed in the central bore and spaced from the walls thereof and against the ridge means of the solenoid and in contact therewith. Upon energization of the solenoid, the armature member strikes the inner pole and transfers its kinetic energy by means of the ridge means to the absorber for dissipation.

These and other advantages will become clear in connection with the following drawings, description and claims.

DETAILED DESCRIPTION OF THE PREFERRED EMBODIMENT

The basic principal to eliminate armature bounce is to transfer the kinetic energy of the armature to another member. This is seen in the prior art.

Figure 1:
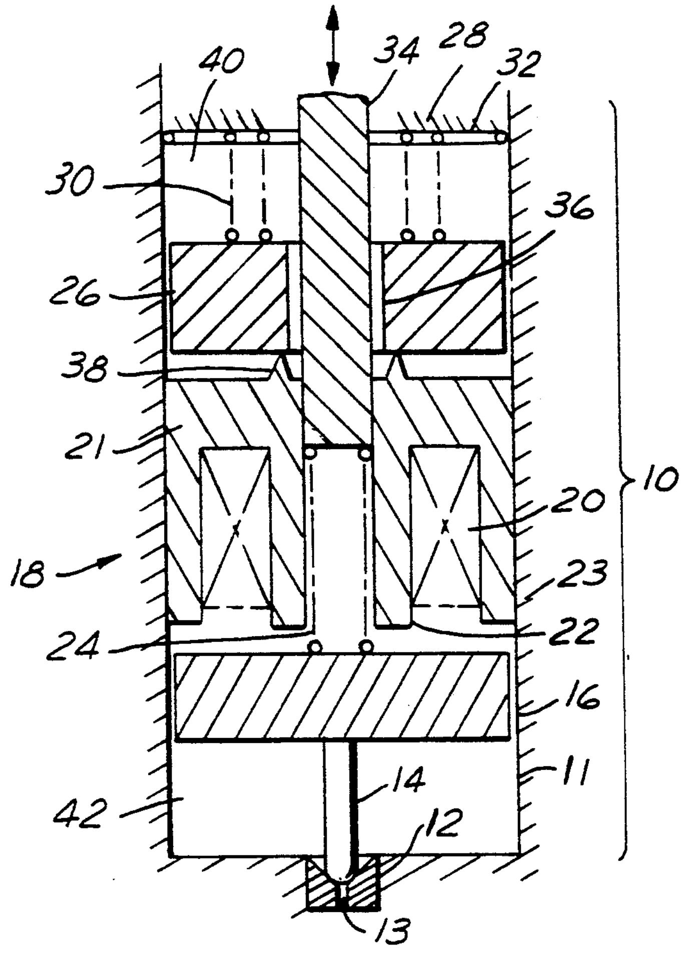
FIG. 1 is a sectional schematic view of the invention as applied to a solenoid actuated high pressure valve.

In FIG. 1, there is illustrated in sectional schematic form, the elements of a solenoid operated valve 10 such as may be used in high pressure fluid applications. For the purposes of illustration only, all elements are to be considered axisymetric. The valve is mounted in a central bore 11 of a housing and has a valve seat member 12 with a valve 13 at one end of the bore 11. A valve stem 14 is operable to open and close the valve 13. Connected to the valve stem is an armature 16. In the alternative, the armature 16 may be coupled to the valve stem 14, as taught in the prior art, such as in U.S. Pat. No. 4,978,072, in order to assist in the dissipation of kinetic energy of the armature upon the closing of the valve by separating the valve stem from the armature.

The armature 16 is attracted to the stator 18 which is illustrated as an E-shaped pole member wherein the inner pole member 22 extends further from the stator web member 21 than the outer pole member 23. The outer pole member 23 is secured to the wall of the central bore 11 so that stator does not axially move. Wound in the space between the inner and outer poles is a coil member 20. Axially aligned with the center of the stator and in-line with the valve stem 14 is a means 34 for dynamic valve adjustment. In the preferred embodiment, the dynamic valve adjustment means 34 forms a backstop for adjusting the working length of the armature return spring 24.

Positioned in axial alignment with the stator 18 is an absorber 26 which is spaced from a stop 28 by means of an absorber return spring 30. As illustrated in FIG. 1, an optional absorber 32 may be positioned on the stop 28 to function as an absorber for the absorber 26. The absorber 26 is formed from a rigid nonmagnetic material and has an aperture or central bore 36 which allows the the static valve adjustment means 34 to pass therethrough without interference. In addition the absorber 26 is spaced from the walls of the central bore 11. By controlling this spacing the absorber 26 will be damped by means of viscous damping to an extent depending upon the characteristics of the fluid in the chamber 40. In addition, the flow of fluid from the chamber 40 to the chamber between the absorber 26 and the stator 18 can operate as a damper.

Formed on the stator web 21 of the stator 18 is a ridge means 38 upon which the absorber 26 rests in its normal state. The ridge means 38 may be formed of a plurality of pointed members secured to the stator web 21 surface or may be an annulus. It is contemplated that the extreme outer surface of the ridge means 38 in a direction axially away from the stator 18 is a very narrow surface.

In the operation of the solenoid operated valve 10, the coil 20 is energized which attracts and moves the armature 16 across the gap to the stator 18. When the armature "slams" against the inner pole member 22. The stator 18 transfers the kinetic energy, by means of the ridge means 38 of the armature 16 to the absorber 26 which is resting against the ridge means 38. The absorber is launched in flight against the force of the absorber return spring 30 dissipating the kinetic energy in the spring 30 and also by means of viscous damping of the absorber 26 with the walls of the central bore 11 or damping as a result of the flow of fluid from the chamber 40 on one side of the absorber 26 to the other side of the absorber. If the fluid in the absorber chamber 40 is other than that in the valve chamber 42, suitable sealing means, not shown, will be properly placed. The fluid, may as a matter of design be air or a liquid.

Since the kinetic energy from the armature 16 is transferred to the absorber 26, the armature 16 will not rebound from the inner pole members 22. The armature remains magnetically attracted to the stator and when the coil is de-energized, the armature return spring 24 will return the armature 16 and hence the valve stem 14 to the valve seat member 12 closing the valve 13.

Figure 2A:
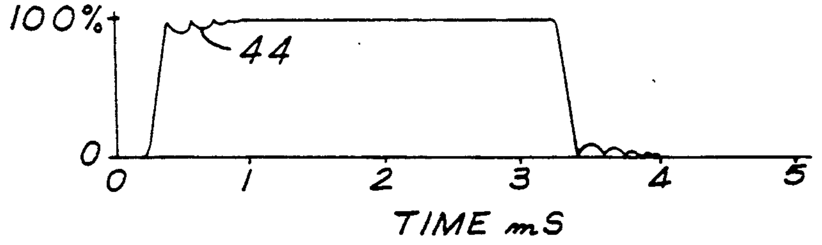
FIG. 2A is a graphic representation of the armature of a solenoid valve without any bounce prevention.

FIG. 2A illustrates in graphic form, the movement of the armature 16 if the absorber 36 was not present. The bumpy line 44 in the graph illustrates that the armature has moved or bounced away from the stator and oscillates back and forth until the amount of kinetic energy in the armature is dissipated or is overcome by the magnetic force of the stator 18. This is the condition which the present invention corrects.

Figure 2B:
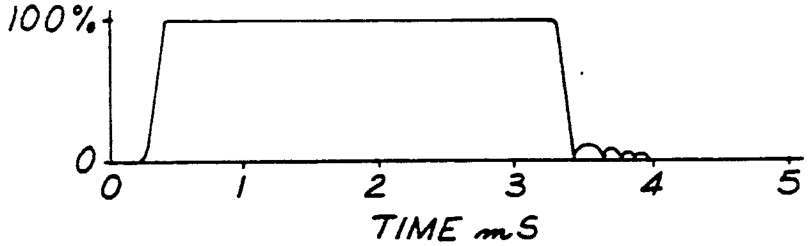
FIG. 2B is a graphic representation of the armature of a solenoid valve with the addition of the absorber of the present invention.

FIG. 2B illustrates in graphic form, the movement of the armature 16 with a properly adjusted system according to the present invention. The armature 16 is magnetically attracted to the stator 18 and remains, until the solenoid coil 20 is de-energized and the armature is returned by means of the armature return spring 24.

The operate time of the solenoid valve is divided into the opening time, which is the time that the armature takes to become energized and moves, across the gap, from the its rest position to a position against the stator. The closing time is the time that the armature takes to move across the gap from the stator to its rest position. The open time is the time between the opening time and closing time and is calibrated to control the amount of fluid flowing from the valve. At the end of the closing time is the closing bounce which will allow some small, even minute, flow of fluid, generally unwanted, from the valve.

Figure 2C:
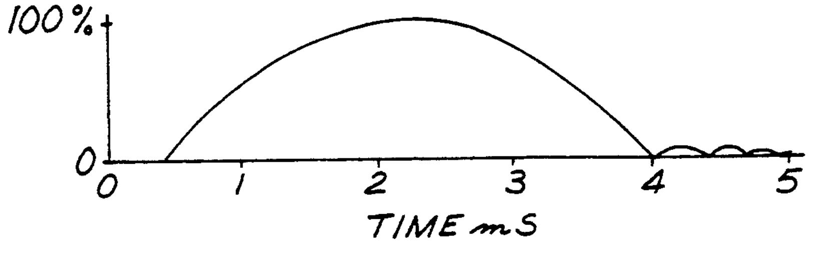
FIG. 2C is a graphic representation of the flight, travel or displacement of the absorber of the present invention.

FIG. 2C illustrates in graphic form, the ideal flight, travel or displacement of the absorber during the total operate time of the solenoid valve. By proper adjustment of the mass of the absorber 26, the mass of the stator inner pole 22, the spring constant of the stator web 21, and the spring rate and constant of the energy absorber spring 30, the absorber will not return to is rest position against the stator 18 until after the coil 20 is de-energized. By doing so, the absorber will not induce any transfer of its kinetic energy through the stator inner pole 22 to armature 16 to cause the armature to bounce. It is this calculation that will allow the present system to work with a pulse width between 0.4 to 3 milliseconds and the operate periods exceeding 5.5 milliseconds. To achieve faster operate times, or higher duty cycles, compromises must be made within the system.

To effect such compromises, the optional absorber absorber 32 may be added. In addition, the fluid in the absorber chamber 40 may be other than air to make use of viscous damping or damping as a result of the flow of fluid from the chamber 40. In each of these compromises, the flight of the absorber may be ended and the absorber 26 brought to rest against the stator 18 sooner.

What is claimed:

1. In a solenoid actuated valve, having a central bore with a needle valve member for closing and opening an aperture located at a valve end, an armature connected to the needle valve member and located in said central bore, an armature return spring, and a solenoid coil when energized to attract the armature and to move the needle valve member, an eliminator for eliminating solenoid armature bounce comprising, an absorber member positioned in the central bore and on the opposite end of the solenoid coil from the armature, and a ridge means mounted on the solenoid coil and supporting the absorber member when the solenoid is not energized, said ridge means operable to transfer to said absorber the kinetic energy from the armature induced in the solenoid upon the armature striking the solenoid.

2. In the solenoid actuated valve according to claim 1 wherein said solenoid has a cylindrical "E" shaped core with the coil wound around the inner pole member of said core and the web member connecting the inner pole member and the outer pole member supporting said ridge means.

3. In the solenoid actuated valve according to claim 2 wherein said inner pole member is axially longer than said outer pole member whereby the armature strikes said inner pole member when said coil is energized and said armature is attracted to said solenoid.

4. In the solenoid actuated valve according to claim 1 wherein said absorber is positioned in the central bore and provides a small annular volume between said absorber and the wall of the inner bore.

5. In the solenoid actuated valve according to claim 1 additionally including spring return means mounted between said absorber and the end of the central bore opposite the valve end.

6. In the solenoid actuated valve according to claim 1, additionally including an second fixed absorber member positioned at the end of the central bore opposite the valve end.

7. In the solenoid actuated valve according to claim 1 wherein the absorber is fabricated from a nonmagnetic rigid material.

8. In the solenoid actuated valve according to claim 1 wherein the ridge means comprises an annular ring mounted on the surface of the web member of the core and the outer surface, in an axial direction from the web member, forms a line contact with said absorber.

9. A method of eliminating armature bounce in a solenoid actuated valve when the solenoid is energized and the armature strikes the solenoid comprising the steps of;

positioning in a central bore, a solenoid having an cylindrical "E" core with the inner pole extending further than the outer pole;

positioning an armature in axial relationship to the solenoid and facing the extended inner pole;

attaching to the web of the solenoid a ridge means on the outer surface of the solenoid opposite the armature;

locating an absorber member in the central bore and spaced from the walls thereof and against the ridge means of the solenoid and in contact therewith, so that upon energization of the solenoid, the armature member strikes the inner pole and transfers its kinetic energy by means of the ridge means to the absorber for dissipation.

10. A method of eliminating armature bounce in a solenoid actuated valve when the solenoid is energized and the armature strikes the solenoid according to claim 9 additionally including the step of positioning a return spring between the absorber and the end of the central bore.

* * * * *